United States Patent
Henry (10) Patent No.: US 9,157,555 B2
(45) Date of Patent: Oct. 13, 2015

(54) APPARATUS AND METHOD FOR A BALL JOINT FITTING ASSEMBLY

(71) Applicant: Icon Containment Solutions, LLC, North Salt Lake, UT (US)

(72) Inventor: Drew P. Henry, Oroville, CA (US)

(73) Assignee: ICON CONTAINMENT SOLUTIONS, LLC, North Salt Lake, UT (US)

( * ) Notice: Subject to any disclaimer, the term of this patent is extended or adjusted under 35 U.S.C. 154(b) by 144 days.

(21) Appl. No.: 13/632,973

(22) Filed: Oct. 1, 2012

(65) Prior Publication Data

US 2013/0082460 A1    Apr. 4, 2013

Related U.S. Application Data

(60) Provisional application No. 61/541,927, filed on Sep. 30, 2011.

(51) Int. Cl.
*F16L 5/10* (2006.01)
*F16L 5/02* (2006.01)
*F16L 41/18* (2006.01)

(52) U.S. Cl.
CPC ............. *F16L 5/025* (2013.01); *F16L 41/18* (2013.01); *F16L 2201/30* (2013.01)

(58) Field of Classification Search
USPC ............. 285/141.1, 139.1, 139.2, 138.1, 184, 285/261
See application file for complete search history.

(56) References Cited

U.S. PATENT DOCUMENTS

| | | | | | |
|---|---|---|---|---|---|
| 488,624 | A | * | 12/1892 | Brewster | 285/261 |
| 783,301 | A | * | 2/1905 | McMillan | 285/138.1 |
| 1,043,451 | A | * | 11/1912 | Mosher | 285/138.1 |
| 1,076,289 | A | * | 10/1913 | Jones | 285/138.1 |
| 1,118,970 | A | * | 12/1914 | Thompson | 285/138.1 |
| 1,425,635 | A | * | 8/1922 | Gerald | 285/261 |
| 1,437,372 | A | * | 11/1922 | Walters | 285/261 |
| 1,490,622 | A | * | 4/1924 | Miller | 285/138.1 |
| 1,734,966 | A | * | 11/1929 | Elmendorf | 285/138.1 |
| 2,055,590 | A | * | 9/1936 | Rene | 285/261 |
| 2,666,656 | A | * | 1/1954 | Bruning | 285/138.1 |
| 3,141,231 | A | * | 7/1964 | Davies et al. | 285/261 |
| 4,470,799 | A | * | 9/1984 | Riggs | 285/138.1 |
| 4,726,595 | A | * | 2/1988 | Hanmore | 285/138.1 |
| 6,206,603 | B1 | * | 3/2001 | Graham | 285/261 |
| 8,566,976 | B2 | * | 10/2013 | Evans et al. | 285/261 |

OTHER PUBLICATIONS

Bravo Problem Solved, http://www.sbravo.com/fs.htm, 1992.

* cited by examiner

*Primary Examiner* — David E Bochna
(74) *Attorney, Agent, or Firm* — Kunzler Law Group (57) ABSTRACT

An apparatus for extending a pipe through a wall. The apparatus includes a ball joint through which at least one pipe extends, an inner pipe, which extends through the ball joint and through which a fluid material may transfer, a housing unit, which substantially surrounds the ball joint and comprises resin bonding surfaces that that seal the housing unit to the ball joint, and a flange unit, which affixes to the housing unit and comprises resin bonding surfaces that seal the flange unit to a wall. The angle between the longitudinal axis of the inner pipe and a line orthogonal to the wall through which the pipe extends is in the range of between about 0 and 20 degrees.

19 Claims, 6 Drawing Sheets

APPARATUS AND METHOD FOR A BALL JOINT FITTING ASSEMBLY

CROSS-REFERENCES TO RELATED APPLICATIONS

This application claims the benefit of U.S. Provisional Patent Application No. 61/541,927 entitled "APPARATUS AND METHOD FOR A BALL JOINT FITTING ASSEMBLY" and filed on Sep. 30, 2011 for Drew P. Henry, which is incorporated herein by reference.

FIELD

This present disclosure relates to fitting devices for tubes that extend through walls and the mounting devices thereof.

BACKGROUND

Numerous conventional fitting devices exist that provide a manner for sealing a tube or a pipe that extends through a wall. However, many applications require double conduit tubing, a fitting device that can penetrate a double walled tank, and flexibility during installation. For example, many applications would benefit from a fitting device that could pass a double conduit pipe through a tank wall at an angle. Conventional devices, however, fail to provide such a means for angling the tubing and therefore greatly restrict the ease of installation and severely limit the effective implementation of the fitting device. Further, conventional fitting devices fail to provide a spacing system for the inner and outer flanges of the fitting, thereby causing improper seating and sealing of the fitting device on the tank wall(s).

SUMMARY

From the foregoing discussion, it should be apparent that a need exists for an apparatus, system, and method that provides for double conduit piping to pass through a wall of tank. Beneficially, such an apparatus, system, and method would allow for a fitting that provides for double conduit piping to pass through a wall of a tank at an angle.

The subject matter of the present application has been developed in response to the present state of the art, and in particular, in response to the problems and needs in the art that have not yet been fully solved by currently available fittings. Accordingly, the present disclosure has been developed to provide an apparatus, system, and method for passing double conduit piping through a wall that overcome many or all of the above-discus discussed shortcomings in the art.

The present disclosure relates to an apparatus for extending a pipe through a wall. The apparatus includes a ball joint through which at least one pipe extends, an inner pipe, which extends through the ball joint and through which a fluid material may transfer, a housing unit, which substantially surrounds the ball joint and comprises resin bonding surfaces that that seal the housing unit to the ball joint, and a flange unit, which affixes to the housing unit and comprises resin bonding surfaces that seal the flange unit to a wall.

The housing unit of the apparatus may also include both a first housing unit and a second housing unit. The flange unit may also comprise a first flange unit and a second flange unit. In one embodiment, the apparatus includes a measurement system for spacing apart the flange units according to the thickness of a wall. The angle between the longitudinal axis of the inner pipe and a line orthogonal to the wall through which the pipe extends is in the range of between about 0 and 20 degrees. In another example, the angle between the longitudinal axis of the inner pipe and a line orthogonal to the wall through which the pipe extends is about 15 degrees. The apparatus may also include an outer pipe which extends from the ball joint and has a comparatively larger diameter than the diameter of the inner pipe. The apparatus may also include an interstitial pipe space monitor that monitors the properties and condition of the space between the inner pipe and the outer pipe.

The present disclosure also relates to a ball joint system for extending a pipe through a wall. The system includes a fluid holding tank, a ball joint traversing a wall of the tank through which at least one pipe extends, an inner pipe, which extends through the ball joint and through which a fluid material may transfer, a housing unit, which substantially surrounds the ball joint and comprises resin bonding surfaces that that seal the housing unit to the ball joint, and a flange unit, which affixes to the housing unit and comprises resin bonding surfaces that seal the flange unit to a wall.

The housing unit of the system may also include both a first housing unit and a second housing unit. The flange unit may also comprise a first flange unit and a second flange unit. In one embodiment, the system includes a measurement system for spacing apart the flange units according to the thickness of a wall. The angle between the longitudinal axis of the inner pipe and a line orthogonal to the wall through which the pipe extends is in the range of between about 0 and 20 degrees. In another example, the angle between the longitudinal axis of the inner pipe and a line orthogonal to the wall through which the pipe extends is about 15 degrees.

The system may also include an outer pipe which extends from the ball joint and has a comparatively larger diameter than the diameter of the inner pipe. The system may also include an interstitial pipe space monitor that monitors the properties and condition of the space between the inner pipe and the outer pipe. In one embodiment, the system may include an interstitial wall space monitor that monitors the properties and conditions of the space between the two wall layers.

Also included in the present disclosure are details relating to a method for installing tubing through a wall. The method includes forming a hole in a wall, placing a ball joint in the hole formed in the wall, wherein tubing may pass through the ball joint, loosely positioning a first and a second housing unit substantially around the ball joint, loosely threading a first flange unit on the first housing unit and a second flange unit on the second housing unit, applying a resin to a resin surface of each flange unit and applying a resin to a resin surface of each housing unit, threading the first and second housing units together and permanently bonding the resin surface of each housing unit to the ball joint, wherein the ball joint is angled in a desired orientation, and threading the first and second flange units towards the wall and permanently bonding the resin surface of each flange unit to the wall.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
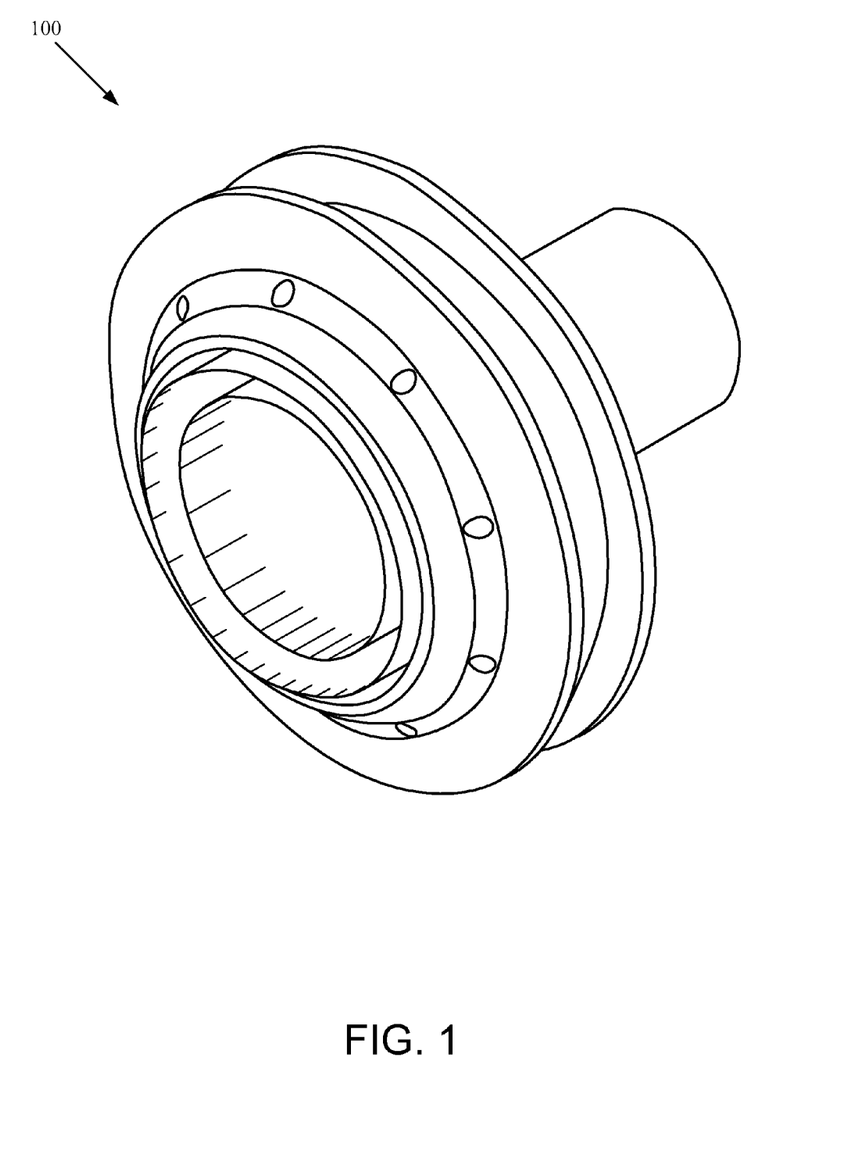
FIG. 1 depicts one embodiment of a ball joint fitting apparatus ("fitting") that can be used for extending a pipe through a wall.

FIG. 1 depicts one embodiment of a ball joint fitting apparatus 100 ("fitting") that can be used for extending a pipe through a wall. In one embodiment, for example, the fitting 100 can be used in an underground gasoline storage tank. In such an application, the fitting creates a rigid and durable seal through which a pipe could extend outward from the tank. Additionally, the fitting 100 provides for a second pipe to extend outward from the wall of the tank, thus creating a double conduit pipeline (required in certain applications).

In the present disclosure, the terms pipe and tube will be used interchangeably, both referring to the channel through which the material contained within the tank will pass. The tank and the components of the fitting 100 may be constructed of durable plastic, carbon fiber, metal, fiberglass, or other suitable material recognized by those of skill in the art. The materials may also be selected according to the specifics of a given application.

Figure 2:
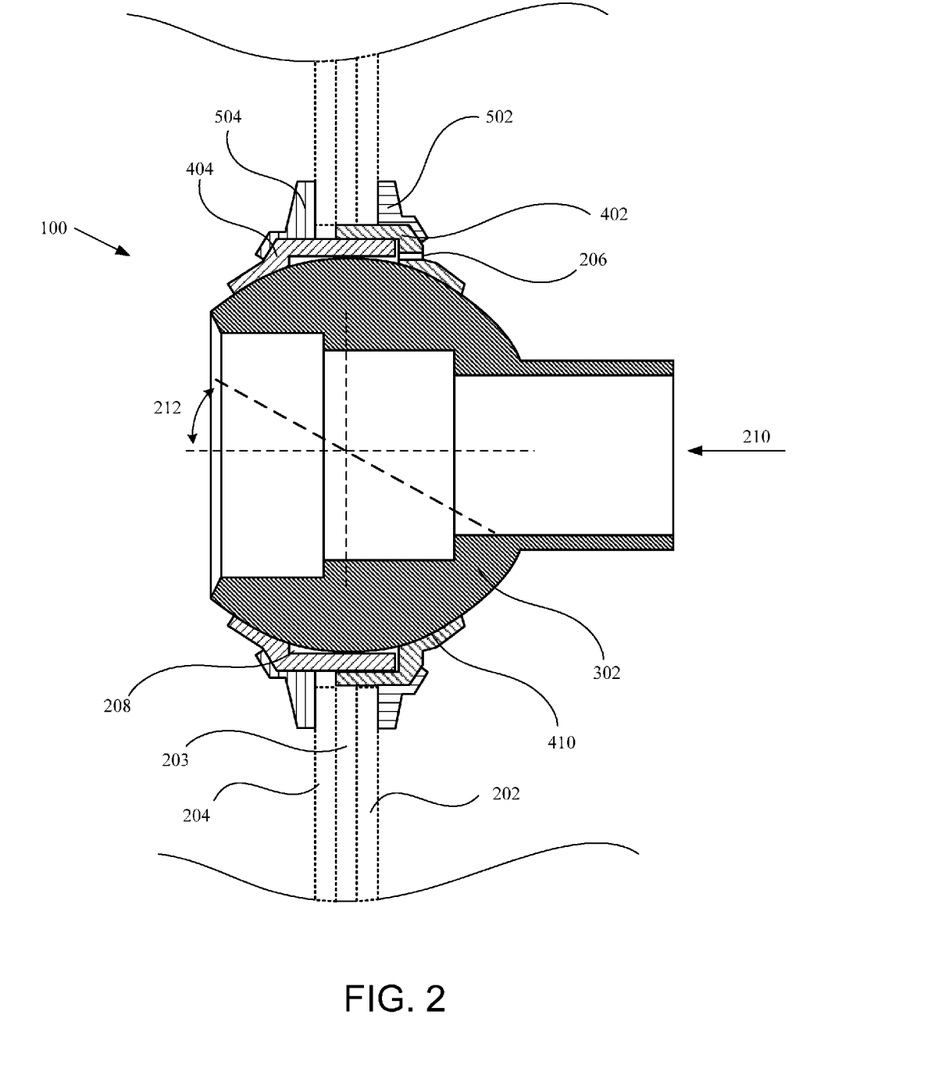
FIG. 2 is one embodiment of a standard cross-sectional view of the fitting (pipes not depicted)

FIG. 2 is one embodiment of a cross-sectional view of the fitting 100 (pipes not depicted) positioned in a tank wall 202, 204. At the center of the fitting 100 is a ball joint 302 through which the pipes extend and around which two housing units 402,404 are positioned. There are also two flanges 502,504 that circumscribe the two housing units 402,404, said flanges are used to attach and seal the fitting 100 onto an inner tank wall 202 and an outer tank wall 204. In one embodiment the fitting 100 may be used to extend pipes through a single wall and in another embodiment the fitting 100 may be used to extend pipes through a tank with a double wall 202,204 (as depicted in FIG. 2).

The fitting 100 further provides a wall monitoring port 206 through which a device can be securely inserted to monitor an interstitial wall space 208 and report any leaks or defects that may occur between the two walls 202,204. The wall monitoring port 206 does not compromise the overall seal of the fitting 100 because the monitoring device is firmly affixed within the wall monitoring port 206 to ensure a complete and robust seal. The interstitial wall space 208 is in fluid communication with the space 203 between the two walls 202,204 because the housing units 402,404 are not attached to one another via an air-tight seal. Therefore, the device within the wall monitoring port 206 can check the condition of the interstitial wall space 208, which is representative of the condition between the two walls 203.

In one embodiment, a pressure sensor may be placed within the wall monitoring port 206 to check for pressure changes between the walls of the tank. If the inner wall 202 were to fail or be defective in some way, the product contained within the tank would leak into the space 203 between the walls, thereby changing the pressure within the interstitial wall space 208 and the pressure sensor would alert the user of the condition. In another embodiment, the space 203 between the walls are maintained at a certain pressure; therefore if the outside wall 204 were to develop a structural weakness, the pressure would be affected in the interstitial wall space 208 and the pressure sensor would communicate the evidence of such a defect to the user. In yet another embodiment, the wall space 203 may be filled with a fluid and the wall monitoring port 206 may be calibrated to detect any changes in the composition or pressure of the fluid, thereby alerting the user of a defect in the walls. It is contemplated that other monitoring systems, recognized by those of ordinary skill in the art, may be used in the present disclosure.

The cross-sectional view 200 of the fitting 100 also shows resin surfaces 410 on the housing units 402, 404 and the corresponding outer surface of the ball joint 302 upon which the resin surfaces 410 will attach. Although a more detailed description of the housing resin surfaces 410 is included below with reference to FIG. 4, the cross-sectional view 200 of the fitting 100 favorably shows the interface where resin bonding will occur. Also depicted in FIG. 2 is an arrow marking a view 210 from inside the tank looking down the length of the tubing that will be used below with reference to FIG. 5.

The ball joint fitting 100 permits the installer to angle the pipe that extends out from the tank in order to facilitate alignment with subsequent pipeline components. In one embodiment, the pipe affixed to the ball joint 302 extending out from the tank wall may have an angled position 212 of up to about 20 degrees. For example, if several underground storage tanks were to be connected in series, the present disclosure would provide for the fittings to be angled in such a manner as to make future pipeline connections easier to perform. Also, the present disclosure provides a spacing system whereby an installer can accurately seal the fitting in the wall of the tank according to the wall thickness. A more detailed explanation of the benefits of the present disclosure is described in detail below with reference to FIGS. 3-6.

Figure 3:
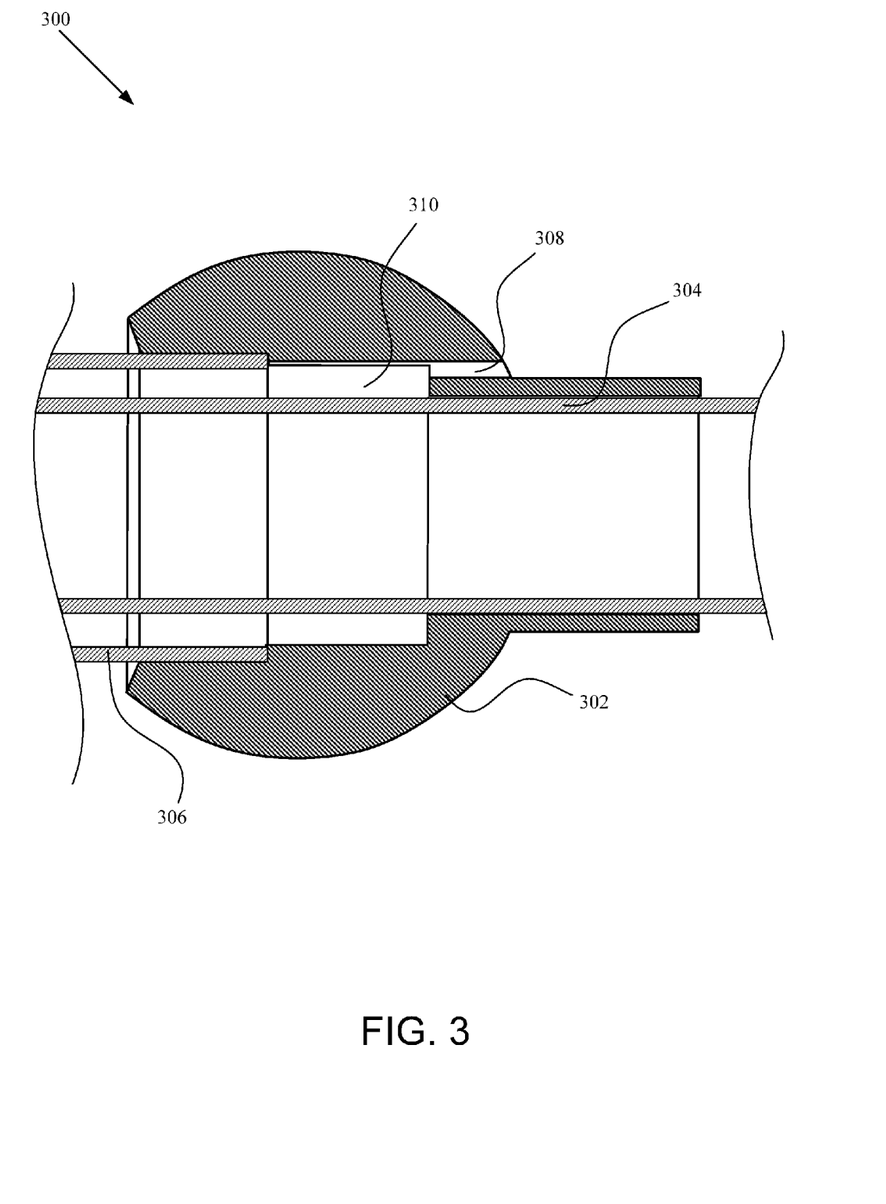
FIG. 3 is one embodiment of the standard cross-sectional view of a ball joint with two pipes attached.

FIG. 3 depicts one embodiment of a cross-sectional view 300 of a ball joint 302 with two pipes 304, 306 attached. In one embodiment, the ball joint 302 is manufactured in such a manner that an inner tube 304 is permanently bonded to the ball joint 302. In another embodiment, the inner tube 304 may be resin bonded to the ball joint 302 just prior to installing the fitting 100 into the tank wall. Also depicted is an outer tube 306 which may be either permanently bonded to the ball joint 302 during manufacture or resin bonded to the ball joint 302 on site. In the present disclosure, the phrase "resin bonding" refers to an industrial strength adhesive process that permanently and rigidly affixes two surfaces to one another. It is contemplated that a suitable resin may be a polymer, plastic or epoxy material or other adhesive recognized by those of ordinary skill in the art.

The outer tube 306 is not in fluid communication with the material passing through the inner tube 304 but is positioned around the inner tube 304 so as to protect the inner tube 304 from puncture, penetration, deterioration or other damage. The outer tube 306 also isolates the contents of the inner tube 304 so as to reduce the likelihood that the contents of the inner tube 304 leak out into the surrounding environment. The ball joint 302 also includes a tube monitoring port 308 and an interstitial tube space 310. A monitoring device may be securely inserted into the tube monitoring port 308 to check the status and conditions within the interstitial tube space 310. The inserted device will not compromise the integrity of the seal because the device will be firmly affixed within the tube monitoring port 308.

In one embodiment, a pressure sensor may be placed within the tube monitoring port 308 to check for pressure changes in the annular space between the inner and the outer tube. In another embodiment, the annular space between the tubes is maintained at a certain pressure and the pressure sensor checks for any pressure changes. In yet another embodiment, the interstitial tube space 310 is filled with a fluid and the tube monitoring port 308 contains a device that is calibrated to detect any changes in the composition or pressure of the fluid. It is contemplated that other monitoring systems, recognized by those of ordinary skill in the art, may be used in the present disclosure.

Figure 4:
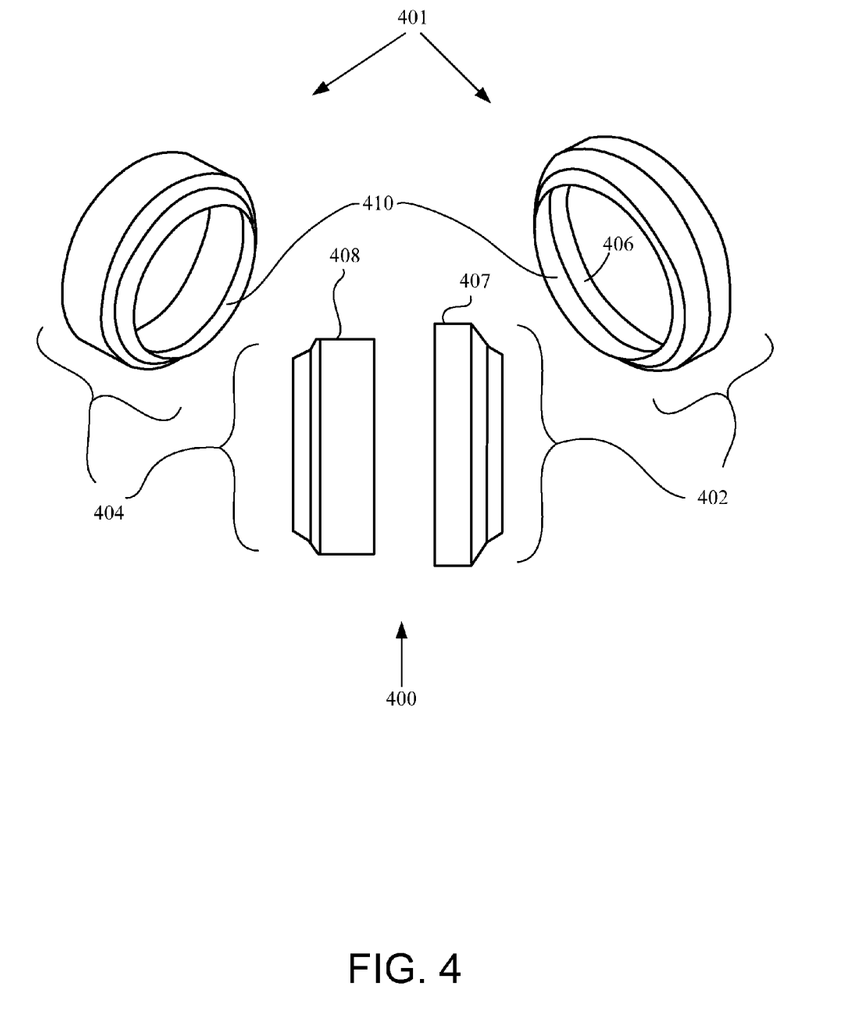
FIG. 4 depicts one embodiment of a first housing unit and an second housing unit from both a standard view and a perspective view.

FIG. 4 depicts one embodiment of both a side view 400 and a perspective view 401 of the first housing unit 402 and the second housing unit 404. As depicted, a portion of the first housing unit 402 has a comparatively larger diameter than a portion of the diameter of the second housing unit 404. The first housing unit 402 has an internal threaded surface 406 and an external threaded surface 407. The second housing unit 404 has a single threaded surface 408 that is wider than the threaded surfaces 406, 407 of the first housing unit 402. Therefore when the housing units 402, 404 are placed around the ball joint 302 in preparation for installation, the first housing unit 402 connects to the second housing unit 404 via mechanical threading. As mentioned above with reference to FIG. 2, the mechanical connection created by threading the two housing units together is not an air-tight seal and allows for the space between the walls 202, 204 to be in fluid connection with the interstitial wall space 208.

Also depicted in FIG. 4 are the resin surfaces 410 of the housing units 402, 404. Such surfaces 410 are located on the inside of the housing units 402, 404 and, prior to installing the fitting 100 into the tank wall, a resin adhesive is applied to the resin surfaces 410. In one embodiment, the width of the resin surfaces 410 is in the range of between about 0.125 inches and 3 inches. In another embodiment, the width of the resin surfaces 410 is in the range of between about 0.5 inches and 2 inches. In yet another embodiment, the width of the resin surfaces 410 is about 1.0 inch.

The resin surfaces 410 of the housing units 402, 404, upon installation of the fitting 100, bond to the outer surface of the ball joint 302. The orientation of this resin bond between the housing units 402, 404 and the ball joint 302 provides installation flexibility so that the pipes can extend outward from the tank wall at various angles. In one embodiment, the ball joint 302 may be oriented and sealed in such a way so that the tubing extends substantially orthogonal from the face of the tank wall. In another embodiment, the ball joint 302 may be oriented and sealed in such a manner so that the tubing extends through the tank wall at an angle of up to 20 degrees. Because the fitting 100 provides for this installation flexibility, planning for and aligning subsequent connections to the tubing will be less complicated and less demanding.

Figure 5:
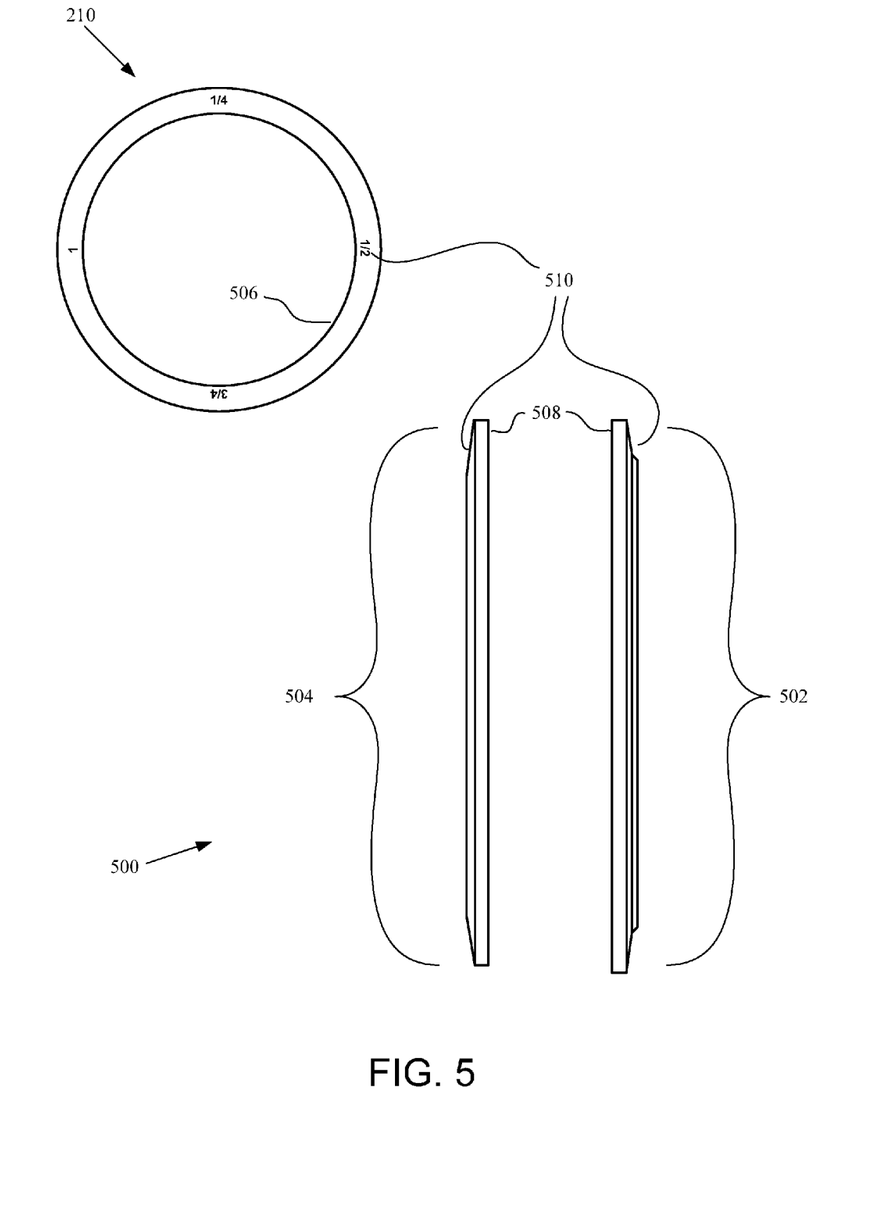
FIG. 5 depicts one embodiment of a first flange unit and a second flange unit from the standard view and also depicts the first flange unit from a view from within the tank looking along the length of the tubing.

FIG. 5 depicts one embodiment 500 of a side view of a first flange unit 502 and a second flange unit 504 and also depicts the first flange unit 502 from a view 210 from within a tank looking along the length of the tubing. The second flange unit 504 is substantially similar to the first flange unit 502 because both flanges 502, 504 have a threaded surface 506 and a resin surface 508. The resin surfaces 508 are the flat surfaces on the flange units 502, 504 that face towards each other on the assembled fitting 100 and that eventually bond with the tank walls (202, 204 from FIG. 2). The threaded surfaces 506 are the thin inner surfaces of the inner diameter of the flange units 502, 504 that mechanically attach to the threaded surfaces 406, 407 of the housing units 402, 404. For example, once the first housing unit 402 and the second housing unit 404 are mechanically connected to each other about the ball joint 302, the threaded surface 506 of the first flange unit 502 may be threaded onto the external threaded surface 407 of the first housing unit 402 and the threaded surface 506 of the second flange unit 504 may be threaded onto the threaded surface 408 of the second housing unit 404.

Both flange units 502, 504 also include measurement marks 510 on the faces of the respective flange units that are opposite of the resin surfaces 508. Such measurement marks 510 are used as part of a wall thickness spacing system. The person installing the fitting 100, after ascertaining the wall thickness of the tank, need only mechanically thread the flange units 502,504 as far onto the respective housing units 402, 404 as indicated by the measurement marks. By so doing, the fitting 100 will be accurately and securely seated against the tank walls and the resin coated surfaces of the flange units 502, 504 will bond with the tank walls to create a rigid and permanent seal. In one embodiment, the measurement marks display wall thickness ranges of between about 0.375 inches and 1.0 inch.

Figure 6:
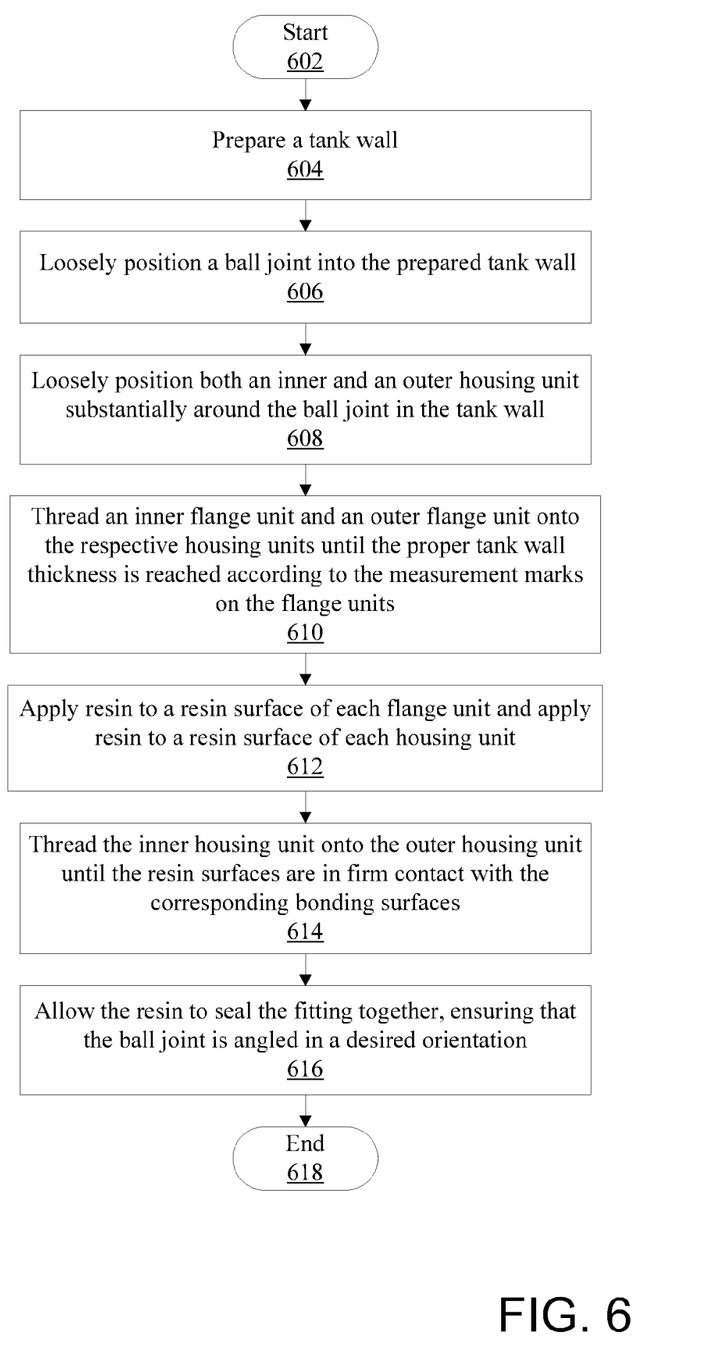
FIG. 6 is a schematic flow chart diagram illustrating one embodiment of a method for installing a ball joint fitting apparatus within a wall.

FIG. 6 is a schematic flow chart diagram 600 depicting one embodiment of a method for installing a ball joint fitting apparatus 100 within a wall. The method starts 602 by preparing 604 a tank wall for the fitting 100 installation. A circular hole may be drilled into the tank wall that is just wide enough to loosely position 606 a ball joint 302 into the prepared tank wall. The method continues by loosely positioning 608 both a first housing unit 402 and a second housing unit 404 substantially around the ball joint 302 within the tank wall.

The method continues by threading 610 a first flange unit 502 and a second flange unit 504 onto the respective housing units 402, 404 until the proper tank wall thickness is reached according to the measurement marks 510 on the flange units 502, 504. For example, at this point in the method a hole has been drilled into the tank wall and the ball joint 302 is loosely housed within the housing units 402, 404, and the housing units are loosely positioned within the prepared hole in the wall. Also, the flange units 502, 504 have been threaded onto the respective housing units 402,404 until the proper wall thickness is identified on the measurement marks 510.

The method continues by applying 612 a resin to the resin surfaces 410, 508 of the housing units 402, 404 and the flange units 502, 504 and then threading 614 the first housing unit 402 onto and around the second housing unit 404 until the resin surfaces are firmly pressed against the respective bonding surfaces. The type and amount of resin to be applied to the resin surfaces is application specific and it is contemplated that one of ordinary skill in the art is capable of making such determinations.

For example, in one embodiment an epoxy based resin may be used as the bonding agent. The installer first mixes together the two separate epoxy resins to activate their adhesive properties, after which the activated epoxy is spread evenly over the resin surfaces 410, 508 of the housing units 402, 404 and the flange units 502,504. With the epoxy coating the resin surfaces, the first housing unit 402 may be threaded onto the second housing unit 404 until the housing resin surfaces 410 become firmly pressed against the ball joint 302 and the flange resin surfaces 508 are firmly pressed against the tank walls. The ball joint 302 must be oriented according to the desired angle of the tubing that will extend through the wall of the tank. The resin is then allowed 616 time to dry and the method ends 618 once the fitting 100 and its components have been rigidly sealed to one another and the fitting 100 has been rigidly sealed to the tank walls.

The present invention may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for extending a pipe through a wall, the apparatus comprising:
   a ball joint;
   an inner pipe, which extends through the ball joint and through which a fluid material may transfer;
   an outer pipe which extends from the ball joint, the outer pipe comprising a comparatively larger diameter than the diameter of the inner pipe, wherein an annular space is formed between the inner pipe and the outer pipe;
   a housing unit, which substantially surrounds the ball joint and comprises resin bonding surfaces that that seal the housing unit to the ball joint; and
   a flange unit, which affixes to the housing unit and comprises resin bonding surfaces that seal the flange unit to a wall.

2. The apparatus of claim 1, wherein the housing unit comprises both a first housing unit and a second housing unit.

3. The apparatus of claim 1, wherein the flange unit comprises both a first flange unit and a second flange unit.

4. The apparatus of claim 3, further comprising a measurement system for spacing apart the flange units according to the thickness of a wall.

5. The apparatus of claim 1, wherein the angle between the longitudinal axis of the inner pipe and a line orthogonal to the wall through which the pipe extends is in the range of between about 0 and 20 degrees.

6. The apparatus of claim 1, wherein the angle between the longitudinal axis of the inner pipe and a line orthogonal to the wall through which the pipe extends is about 15 degrees.

7. The apparatus of claim 1, further comprising an interstitial pipe space monitor that monitors the properties and condition of the space between the inner pipe and the outer pipe.

8. A ball joint system comprising:
   a fluid holding tank comprising a wall;
   a ball joint traversing the wall of the tank;
   an inner pipe, which extends through the ball joint and through which a fluid material may transfer;
   an outer pipe which extends from the ball joint, the outer pipe comprising a comparatively larger diameter than the diameter of the inner pipe, wherein an annular space is formed between the inner pipe and the outer pipe;
   a housing unit, which substantially surrounds the ball joint and comprises resin bonding surfaces that that seal the housing unit to the ball joint; and
   a flange unit, which affixes to the housing unit and comprises resin bonding surfaces that seal the flange unit to a wall of the fluid holding tank.

9. The system of claim 8, wherein the housing unit comprises both a first housing unit and a second housing unit.

10. The system of claim 8, wherein the flange unit comprises both a first flange unit and a second flange unit.

11. The system of claim 8, further comprising a measurement system for spacing apart the flange units according to the thickness of a wall.

12. The system of claim 8, wherein the angle between the longitudinal axis of the inner pipe and a line orthogonal to the wall through which the pipe extends is in the range of between about 0 and 20 degrees.

13. The system of claim 8, wherein the angle between the longitudinal axis of the inner pipe and a line orthogonal to the wall through which the pipe extends is about 15 degrees.

14. The system of claim 8, further comprising an interstitial pipe space monitor that monitors the properties and condition of the space between the inner pipe and the outer pipe.

15. The system of claim 8, wherein the wall of the fluid holding tank comprises two layers.

16. The system of claim 15, further comprising an interstitial wall space monitor coupled to the housing unit that monitors the properties and conditions of the space between the two wall layers.

17. The system of claim 16, wherein the interstitial wall space monitor coupled to the housing unit also monitors the properties and condition of the annular space between the inner pipe and the outer pipe.

18. An apparatus for extending a pipe through a wall, the apparatus comprising:
 a ball joint comprising a central channel, wherein an inner pipe is extendable though the central channel and an outer pipe is extendable from the ball joint, wherein the outer pipe has a comparatively larger diameter than the diameter of the inner pipe, wherein an annular space is formed between the inner pipe and the outer pipe;
 a housing unit, which substantially surrounds the ball joint and comprises resin bonding surfaces that seal the housing unit to the ball joint; and
 a first flange unit and a second flange unit that each comprise resin bonding surfaces configured to seal to a wall, wherein the first flange unit is threadably coupleable to the first housing unit and the second flange unit is threadably coupleable to the second housing unit.

19. The apparatus of claim 18, wherein the housing unit comprises a first housing unit and a second housing unit that each comprise resin bonding surface configured to seal to an exterior surface of the ball joint, wherein the first housing unit and the second housing unit are coupled together via non air-tight threads.

* * * * *